US008207958B2

(12) United States Patent
Lee et al.

(10) Patent No.: US 8,207,958 B2
(45) Date of Patent: Jun. 26, 2012

(54) DISPLAY HAVING RUSH CURRENT REDUCTION DURING POWER-ON

(75) Inventors: Bum Lee, Cheonan-si (KR); Il-Koo Nah, Yongin-si (KR); Seoung-Bum Pyoun, Pyeongtack-si (KR); Hong-Sig Chu, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 427 days.

(21) Appl. No.: 12/500,209

(22) Filed: Jul. 9, 2009

(65) Prior Publication Data

US 2010/0177081 A1 Jul. 15, 2010

(30) Foreign Application Priority Data

Jan. 12, 2009 (KR) ........................ 10-2009-0002331

(51) Int. Cl.
*G06F 3/038* (2006.01)
*G09G 3/36* (2006.01)

(52) U.S. Cl. ........................... 345/211; 345/214; 345/98

(58) Field of Classification Search .......... 345/211–212, 345/214, 87–98
See application file for complete search history.

(56) References Cited

U.S. PATENT DOCUMENTS 6,064,360 A * 5/2000 Sakaedani et al. .............. 345/92
6,903,734 B2 * 6/2005 Eu ................................ 345/211
7,109,965 B1 * 9/2006 Lee et al. ........................ 345/98
7,944,440 B2 * 5/2011 Park .............................. 345/211
2006/0022971 A1 * 2/2006 Luo et al. ...................... 345/211
2006/0289893 A1 * 12/2006 Lee et al. ...................... 257/147
2008/0061634 A1 * 3/2008 Iwata et al. ................... 307/141
2008/0106666 A1 * 5/2008 Lee et al. ........................ 349/48

FOREIGN PATENT DOCUMENTS

JP 2005-210780 8/2005
KR 10-0724419 3/2007
KR 1020080024387 3/2008

OTHER PUBLICATIONS

English Abstract for Publication No. 1020070029847 (for 10-0724419).
English Abstract for Publication No. 1020080024387.
English Abstract for Publication No. 2005-210780.

* cited by examiner

*Primary Examiner* — Amare Mengistu
*Assistant Examiner* — Hong Zhou
(74) *Attorney, Agent, or Firm* — F. Chau & Associates, LLC

(57) ABSTRACT

A display that has rush current reduction during power-on is provided. A display panel that displays an image includes a gate line and a data line. A voltage generator receives a supply voltage and outputs a gate-on voltage and a gate-off voltage to first and second output nodes, respectively. The voltage generator includes a pull-up capacitor that is charged for a first time period of a power-off period and is discharged for a second time period of the power-off period to increase a voltage level of the second output node, the first and second time periods being consecutive periods of the power-off period. A gate driver selectively applies a gate-on voltage or a gate-off voltage to the gate lines, and a data driver applies a data voltage to the data line.

13 Claims, 6 Drawing Sheets

DISPLAY HAVING RUSH CURRENT REDUCTION DURING POWER-ON

CROSS-REFERENCE TO RELATED APPLICATION

This application claims priority to and the benefit of Korean Patent Application No. 10-2009-0002331 filed on Jan. 12, 2009 in the Korean Intellectual Property Office, the entire content of which is incorporated by reference herein.

BACKGROUND OF THE INVENTION

1. Field of the Invention

The present disclosure relates to displays, and more particularly, to a display capable of reducing a rush current during a power-on period.

2. Discussion of the Related Art

Recently, flat panel displays such as an organic light emitting display device (OLED), a plasma display device (PDP), or a liquid crystal display (LCD), each of which can be substituted for heavy and large cathode ray tube (CRT) displays, have been actively developed.

The PDP is a device for displaying characters and images by using light emitted by a plasma generated in a gas by an electric discharge, and the OLED is a device for displaying characters and images by using light generated by field emission of particular organic materials or polymers. The LCD is a device for displaying characters and images by using light transmitted through a liquid crystal layer interposed between two panels. The transmittance of light that passes through the liquid crystal layer and a polarizer is controlled by an electrical field applied across the liquid crystal layer.

Flat panel displays, the LCD and the OLED, for example, include a display panel on which a matrix of pixels is provided, each pixel having an associated switching element. Display signal lines, including gate lines and data lines are provided on the display panel. A gate driver is provided for transmitting gate signals on the gate lines to the control terminals of the pixel switching elements. A gray scale voltage generator is provided for generating a plurality of gray scale voltages, and a data driver is provided for selecting data voltages, corresponding to video data, from among the gray scale voltages and transmitting the selected data voltages on the data lines to the input terminals of the pixel switching elements. A signal controller is provided for controlling the gray scale voltage generator, the gate driver and the data driver.

SUMMARY OF THE INVENTION

Exemplary embodiments of the present invention provide a display which can prevent a rush current from increasing for a power-on period of the display while suppressing an image sticking phenomenon for a power-off period of the display.

In accordance with an exemplary embodiment of the present invention a display device includes a display panel that displays an image and has a gate line and a data line. A voltage generator receives a supply voltage and outputs a gate-on voltage to a first output node and a gate-off voltage to a second output node. The voltage generator includes a pull-up capacitor that is charged for a first time period of a power-off period and is discharged for a second time period of the power-off period to increase a voltage level of the second output node, the first time period and the second time period being consecutive periods of the power-off period. A gate driver selectively applies the gate-on voltage or the gate-off voltage to the gate lines. A data driver applies a data voltage to the data line.

The voltage generator may further include a first switch that is enabled for the first time period and that transmits the gate-on voltage to the pull-up capacitor to charge the pull-up capacitor, and a second switch that is enabled for the second time period and that transmits the voltage charged in the pull-up capacitor to the second output node.

The first switch may transmit the gate-on voltage to the pull-up capacitor in accordance with the supply voltage, and the second switch transmits the voltage charged in the pull-up capacitor to the second output node according to the gate-on voltage.

The first switch may include an NPN bipolar junction transistor, and the second switch may include a PNP bipolar junction transistor.

When the supply voltage is lower than a first voltage, the first switch may be enabled to transmit the gate-on voltage to the pull-up capacitor, and when the supply voltage is lower than a second voltage, the second switch may transmit the voltage charged in the pull-up capacitor to the second output node, a voltage level of the second voltage being lower than a voltage level of the first voltage.

The voltage generator may further include a first switch that is enabled for the first time period and that transmits the supply voltage to the pull-up capacitor to charge the pull-up capacitor, and a second switch that is enabled for the second time period and that transmits the voltage charged in the pull-up capacitor to the second output node.

The first switch may transmit the gate-on voltage to the pull-up capacitor according to a drive voltage that is generated based upon the supply voltage, and the second switch transmits the voltage charged in the pull-up capacitor to the second output node according to the gate-on voltage.

When the drive voltage is lower than the first voltage, the first switch may be enabled to transmit the gate-on voltage to the pull-up capacitor, and when the drive voltage is lower than the second voltage, the second switch may transmit the voltage charged in the pull-up capacitor to the second output node, a voltage level of the second voltage being lower than that of the first voltage.

The voltage generator may further include a gate-off voltage generator that generates the gate-off voltage, and a gate-off voltage blocking portion that blocks a current path from the second output node to the gate-off voltage generator during the power-off period.

The display panel may further include a switching element that selectively connects the data line to a pixel electrode line according to the gate-on voltage or the gate-off voltage, the switching element being turned on for the second time period.

In accordance with an exemplary embodiment of the present invention a display includes a display panel that displays an image and comprises a gate line and a data line. A voltage generator includes a pull-up capacitor, a first switch that is connected to a first voltage and a second voltage and that selectively charges the pull-up capacitor using the second voltage according to the first voltage, and a second switch that selectively transmits the voltage charged in the pull-up capacitor to the gate-off voltage output node.

The first switch may be enabled for a first time period of a power-off period, and the second switch may be enabled for a second time period of the power-off period, the first time period and the second time period being consecutive periods of the power-off period.

The voltage generator may further include a gate-on voltage generator that generates a gate-on voltage based upon a supply voltage, the first voltage being the supply voltage and the second voltage being the gate-on voltage.

The first switch may transmit the gate-on voltage to the pull-up capacitor according to the supply voltage, and the second switch may transmit the voltage charged in the pull-up capacitor to the second output node according to the gate-on voltage.

When the supply voltage is lower than a first voltage, the first switch may be enabled to transmit the gate-on voltage to the pull-up capacitor, and when the supply voltage is lower than a second voltage, the second switch may be enabled to transmit the voltage charged in the pull-up capacitor to the second output node, a voltage level of the second voltage being lower than a voltage level of the first voltage.

The voltage generator may further include a drive voltage generator that generates a drive voltage based upon the supply voltage, and a gate-on voltage generator that generates the gate-on voltage based upon the drive voltage, the first voltage being the drive voltage and the second voltage being the gate-on voltage.

The first switch may transmit the gate-on voltage to the pull-up capacitor according to the gate-on voltage, and the second switch may transmit the voltage charged in the pull-up capacitor to the second output node according to the gate-on voltage.

When the drive voltage is lower than the first voltage, the first switch may be enabled to transmit the gate-on voltage to the pull-up capacitor, and when the drive voltage is lower than the second voltage, the second switch may be enabled to transmit the voltage charged in the pull-up capacitor to the second output node, a voltage level of the second voltage being lower than that of the first voltage.

BRIEF DESCRIPTION OF THE DRAWINGS

Exemplary embodiments of the present invention will now be described in more detail with reference to the attached drawings in which.

DETAILED DESCRIPTION OF THE EXEMPLARY EMBODIMENTS

Exemplary embodiments of the present invention may take many different forms and should not be construed as being limited to the embodiments set forth herein. Like numbers refer to like elements throughout the specification.

Exemplary embodiments of the present invention are described more fully hereinafter with reference to an LCD. However, it will be understood that the exemplary embodiments of the present invention are not limited to these embodiments and may be applied to flat panel displays including an OLED, and a PDP.

Figure 1:
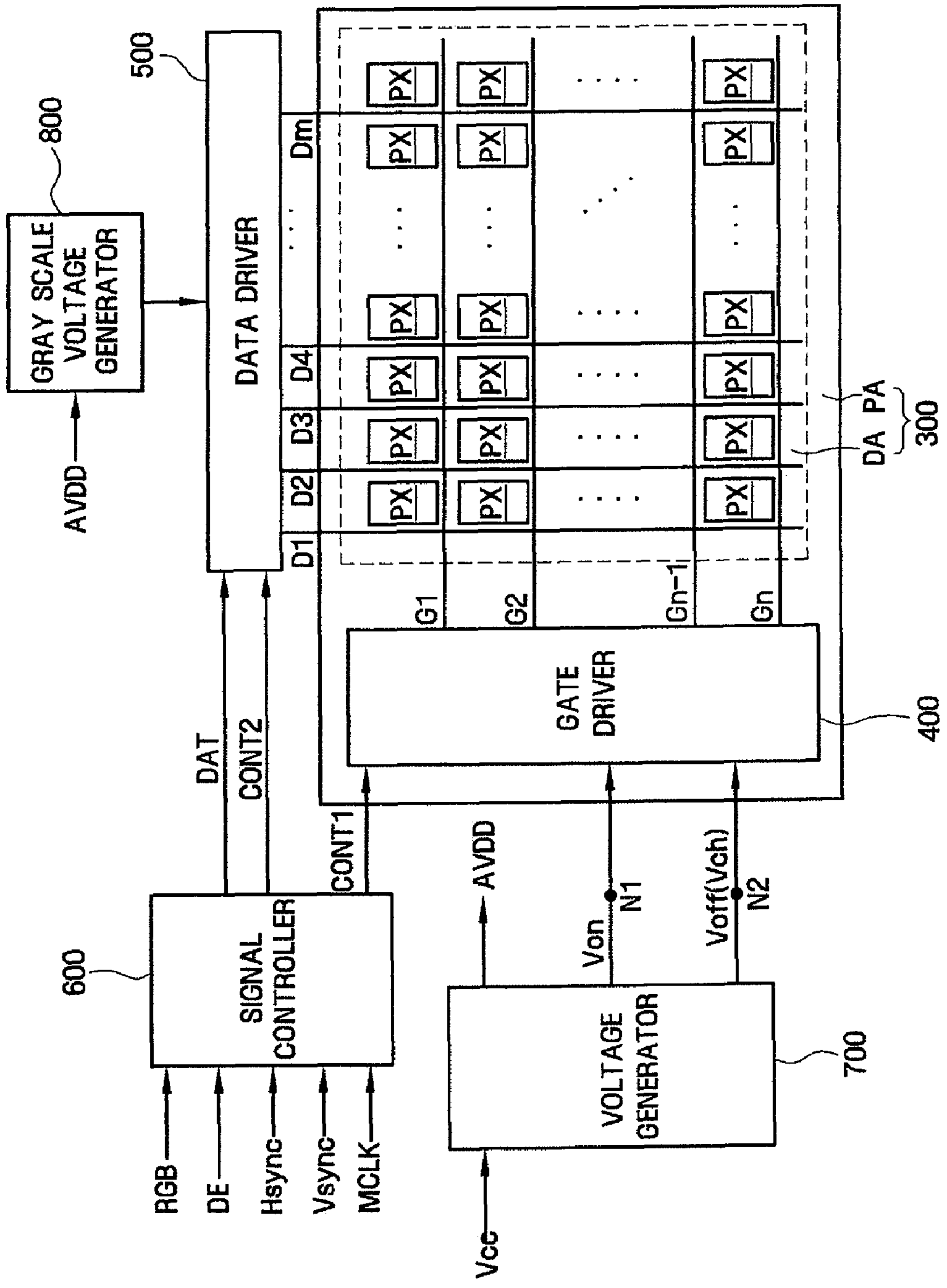
FIG. 1 is a block diagram showing a display according to an exemplary embodiment of the present invention.
Figure 2:
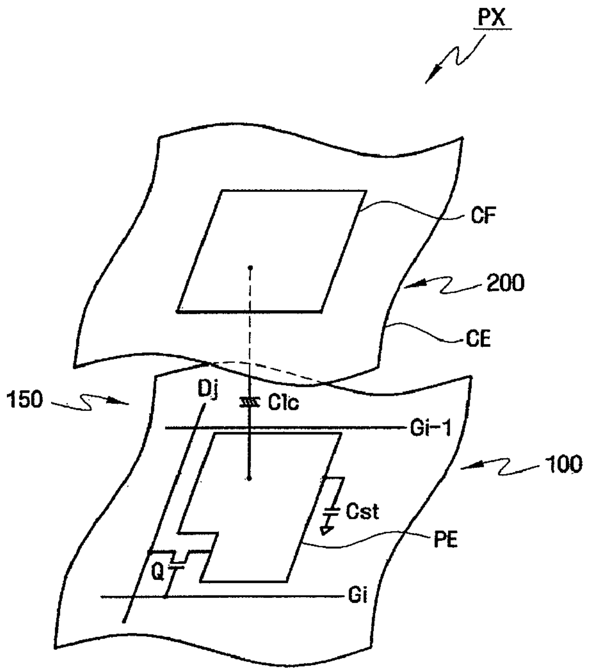
FIG. 2 is an equivalent circuit diagram of a pixel of a display according to an exemplary embodiment of the present invention.

FIG. 1 is a block diagram showing a display according to an exemplary embodiment of the present invention, and FIG. 2 is an equivalent circuit diagram of a pixel of a display according to an exemplary embodiment of the present invention. The display device includes a display panel 300, a signal controller 600, a gate driver 400, a data driver 500, a voltage generator 700, and a gray scale voltage generator 800.

The display panel 300 includes a plurality of gate lines G1, G2 . . . Gn−1, Gn, a plurality of data lines D1, D2, D3, D4 . . . Dm, and a plurality of pixels PX, and is divided into a display area DA that displays an image and a peripheral area PA adjacent to the display area, where no image is displayed.

The display area DA is an area on which an image is displayed, including a first substrate 100 having the plurality of gate lines G1, G2 . . . Gn−1, Gn, the plurality of data lines D1, D2, D3, D4 . . . Dm, switching element Q, and a pixel electrode PE, a second substrate 200 having color filters CF and a common electrode CE, and a liquid crystal layer 150 interposed between the first and second substrates 100 and 200. The gate lines G1, G2 . . . Gn−1, Gn extend in a first direction to be substantially parallel to each other, and the data lines D1, D2, D3, D4 . . . Dm extend in a second direction to be substantially parallel to each other. The peripheral area PA, which surrounds the display area DA, is a portion that is not used to display images, given that the first substrate 100 in an exemplary embodiment may be wider than the second substrate 200.

Referring to FIG. 2, an exemplary embodiment of one pixel PX of the display of FIG. 1 will now be described. A color filter CF is formed on a portion of the second substrate 200, a common electrode CE is formed on the second substrate 200 in such a manner that the common electrode CE faces the pixel electrode PE of the first substrate 100. For example, the pixel PX, which is connected to an i-th (where i=1 to n) gate line Gi and a j-th (where j=1 to m) data line Dj, includes the switching element Q, which is connected to the signal lines Gi, Dj, and a liquid crystal capacitor Clc and a storage capacitor Cst, which are connected to the switching element Q. In an alternative exemplary embodiment, the storage capacitor Cst may be omitted. Unlike in FIG. 2 in which a color filter CF is formed on the second substrate 200 having the common electrode CE, the color filter CF may be formed on the first substrate 100.

The switching element Q is implemented as a thin film transistor (TFT) to transmit a voltage applied to a data line Dj to the pixel electrode PE according to a voltage applied to a gate line Gi. In more detail, when a gate-on voltage Von is applied to the gate line Gi, the switching element Q is turned on to apply the voltage applied to the data line Dj to the corresponding pixel electrode PE. On the other hand, when a gate-off voltage Voff is applied to the gate line Gi, the switching element Q is turned off to hold the voltage applied to the pixel electrode PE. Accordingly, liquid crystal is tilted according to the data voltage, thereby displaying an image.

The signal controller 600 receives original red, green, blue (RGB) image signals and input control signals for displaying the original image signals from an external graphics controller (not shown), and outputs an image signal DAT, a gate control signal CONT1, and a data control signal CONT2. Here, the input control signals include, for example, a vertical synchronization signal Vsync, a horizontal synchronizing signal Hsync, a main clock signal MCLK, and a data enable signal DE. In an embodiment, at least one of the vertical synchronization signal Vsync, the horizontal synchronizing signal Hsync, the main clock signal MCLK, and the data enable signal DE may be omittable.

The gate control signal CONT1, which is provided to the gate driver 400 to control the operation of the gate driver 400, includes a scanning start signal that instructs a scanning start at each frame, and at least one gate clock signal that controls an output period of a gate-on voltage Von. The gate control signal CONT1 may also include an output enable signal OE to define the duration of the gate-on voltage Von.

The data control signal CONT2, which is provided to the data driver 500 to control the operation of the data driver 500, includes a horizontal synchronization start signal to start the operation of the data driver 500, and a load signal to instruct the data driver 500 to apply the data voltages to the data lines D1, D2, D3, D4 . . . Dm.

The gate driver 400 receives the gate control signal CONT1, the gate-on voltage Von and the gate-off voltage, and sequentially supplies the plurality of gate lines G1, G2 . . . Gn−1, Gn with the gate-on voltage or the gate-off voltage. Here, the gate-on voltage Von is received from the voltage generator 700 through a first node N1, and the gate-off voltage Voff is received from the voltage generator 700 through a second node N2.

The gate driver 400 is located in the peripheral area PA of the display panel 300 and is connected to the display panel 430. However, alternatively, the gate driver 400 may be attached to the liquid display panel 300 as a tape carrier package (TCP) by being mounted on a flexible printed circuit film integrated circuit (IC) (not shown). In an alternative embodiment, the gate driver 400 may be mounted on a separate printed circuit board. In addition, while the gate driver 400 located at one side of the display panel 300 has been described, a first gate driving unit and a second gate driving unit included in the gate driver 400 may be located at left and right sides of the display panel 300, respectively.

The data driver 500 receives the image signal DAT and the data control signal CONT2 from the signal controller 600, and applies a plurality of gray scale voltages from the gray scale voltage generator 800, and generates a data voltage corresponding to the image signal DAT to supply the generated data voltage to the lines D1-Dm. The data driver 500 is an IC in the form of a TCP connected to the display panel 300. In an alternative embodiment, the data driver may be formed in the peripheral area PA of the display panel 300.

The voltage generator 700 receives a supply voltage Vcc from an external circuit and generates a drive voltage AVDD, a gate-on voltage Von and a gate-off voltage Voff. The voltage generator 700 receives the external supply voltage Vcc and generates multiple voltages necessary for operating the display device.

Here, the drive voltage AVDD, which is a voltage for generating gray voltages of a plurality of levels, is supplied to the gray scale voltage generator 800. The gate-on voltage Von is supplied to the gate driver 400 through a gate-on voltage output node (which is referred to as a first output node N1, hereinafter). The gate-off voltage Voff is supplied to the gate driver 400 through a gate-off voltage output node (which is referred to as a second output node N2, hereinafter). For example, the voltage generator 700 receives a supply voltage Vcc of 3 V, and generates a gate-on voltage Von of 21 V and a gate-off voltage Voff of −7 V.

In display devices according to exemplary embodiments of the present invention, the voltage generator 700 includes a pull-up capacitor that increases the voltage level of the second output node N2 while the display device is in a power-off period. Here, the power-off period includes a transition period in which the power of the display device is turned off, namely, the period when the supply voltage Vcc is transitioned from an enable level, e.g., 3 V, to a disable level, e.g., 0 V.

In more detail, in the exemplary embodiments of the present invention, the pull-up capacitor is charged for a first time period of the power-off period and discharged for a second time period of the power-off period to increase the voltage level of the second output node N2, the first and second time periods being consecutive periods of the power-off period. Therefore, in the display devices according to exemplary embodiments of the present invention, the voltage is not charged in the pull-up capacitor, so that a large amount of rush current is prevented from being instantaneously generated when the display device is in a power-on period. In addition, when the display device is in a power-off period, the voltage level of the second output node N2 is increased by the voltage charging the pull-up capacitor, so that display defects that may occur when the display device is turned off, such as image sticking, is reduced, which will later be described in more detail with reference to FIGS. 3 through 8.

The gray scale voltage generator 800 receives the drive voltage AVDD, generates a plurality of gray scale voltages and supplies the same to the data driver 500. The gray scale voltage generator 800, including, for example, a resistor string, generates the plurality of gray scale voltages by dividing the drive voltage AVDD having different voltage levels. However, the configuration of the gray scale voltage generator 800 is not limited to the illustrated example, and it will be understood that the internal circuit of the gray scale voltage generator 800 may be implemented in various manners.

Figure 3:
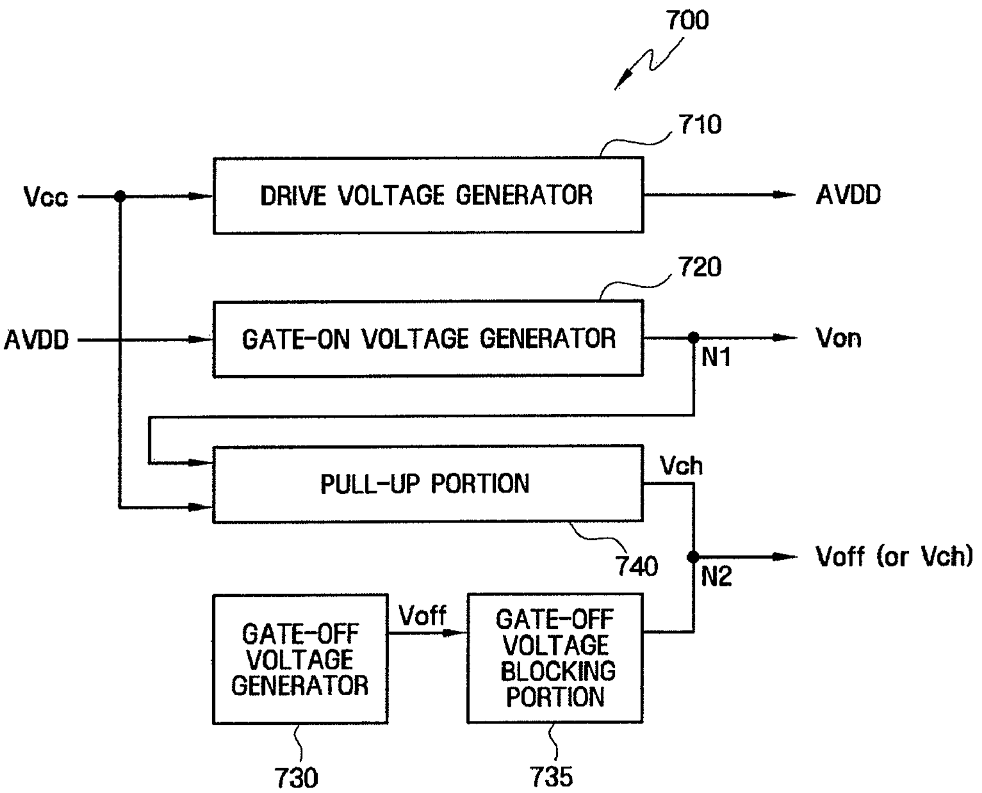
FIG. 3 is a block diagram of the voltage generator shown in FIG. 1.
Figure 4:
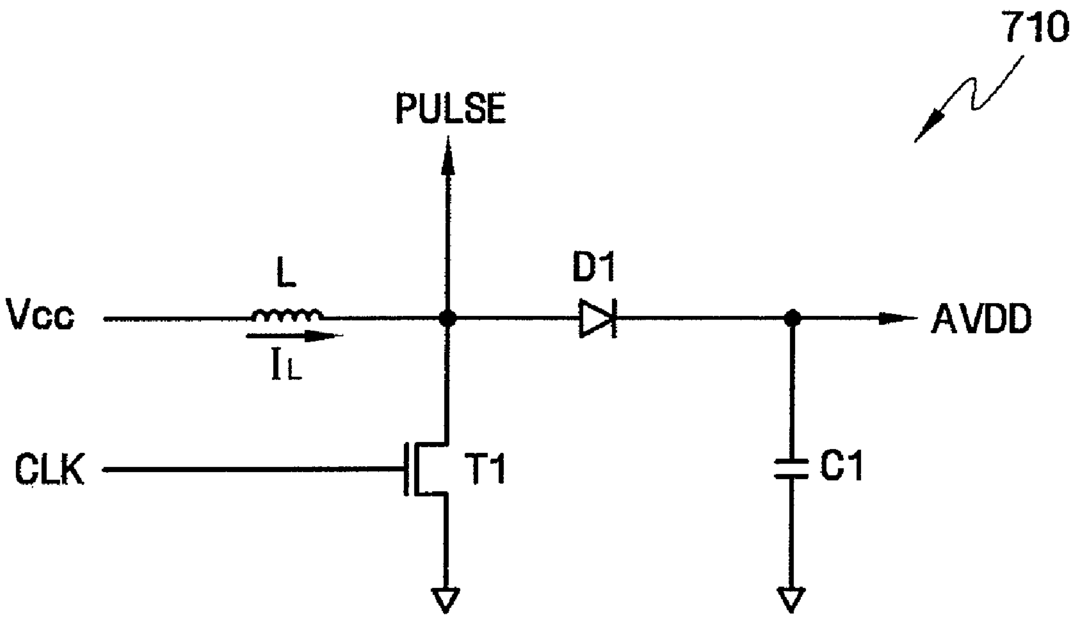
FIG. 4 is a circuit diagram of the drive voltage generator shown in FIG. 3.
Figure 5:
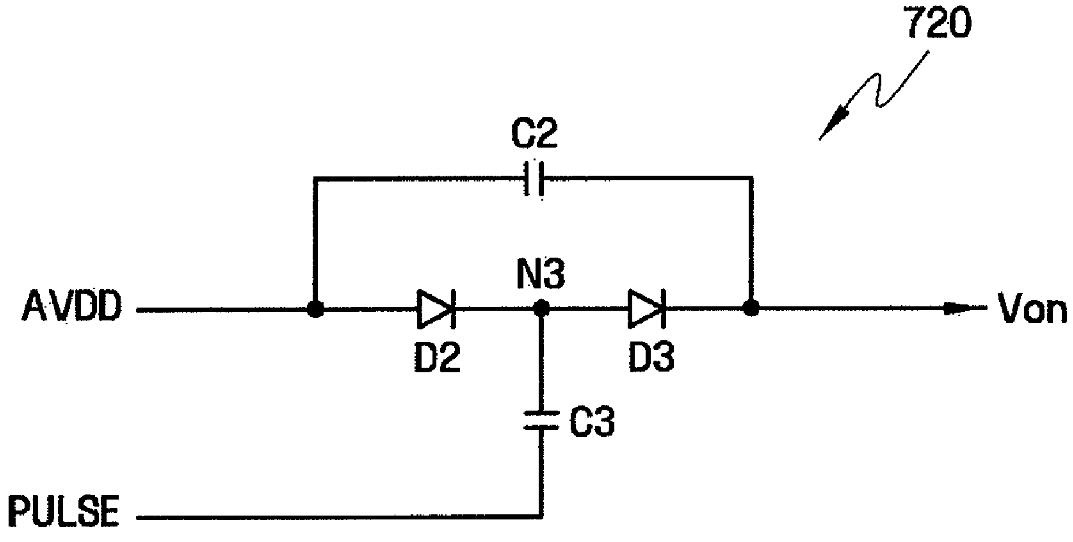
FIG. 5 is a circuit diagram of the gate-on voltage generator shown in FIG. 3.
Figure 6:
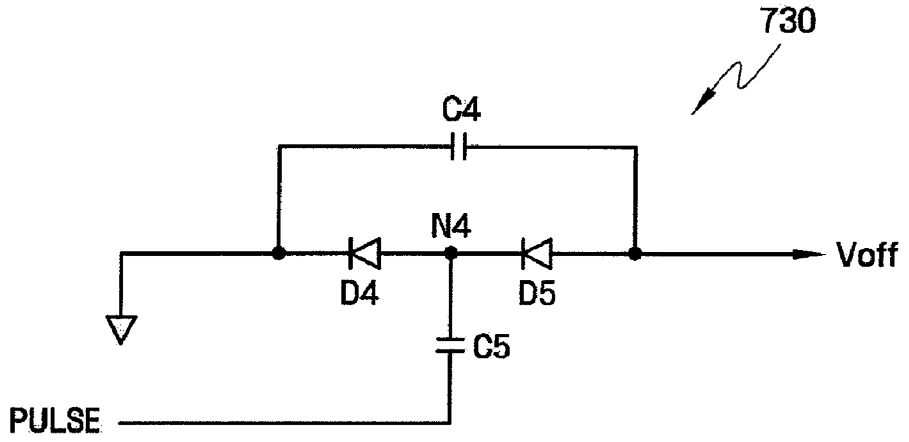
FIG. 6 is a circuit diagram of the gate-off voltage generator shown in FIG. 3.

FIG. 3 is a block diagram of a voltage generator shown in FIG. 1. FIG. 4 is an exemplary circuit diagram of a drive voltage generator shown in FIG. 3. FIG. 5 is an exemplary circuit diagram of a gate-on voltage generator shown in FIG. 3. FIG. 6 is an exemplary circuit diagram of a gate-off voltage generator shown in FIG. 3.

Referring now to FIG. 3, the voltage generator 700 includes a drive voltage generator 710, a gate-on (Von) voltage generator 720, a gate-off voltage (Voff) generator 730 and a pull-up portion 740.

The drive voltage generator 710 receives a supply voltage Vcc from an external circuit and generates a drive voltage AVDD. As described above, the drive voltage AVDD is supplied to the gray scale voltage generator 800 to be used to generate a plurality of gray scale voltages. The drive voltage AVDD is also supplied to the gate-on voltage generator 720 to be used to generate a gate-on voltage Von. In an exemplary embodiment, the drive voltage generator 710 is implemented by a boost converter, as shown in FIG. 4.

Referring to FIG. 4, the drive voltage generator 710 includes an inductor L to which the supply voltage Vcc is applied, a first diode D1 which has an anode connected to the inductor L and a cathode connected to the output terminal of the drive voltage AVDD, a first capacitor C1 which is connected between the cathode of the first diode D1 and the ground voltage, and a transistor T1 which is connected between an anode of the first diode D1 and the ground voltage and to which a clock signal CLK is applied.

The operation of the drive voltage generator 710 will now be described. If the transistor T1 is turned on, an amount of current $I_L$ flowing through the inductor L increases slowly. The amount of current $I_L$ flowing through the inductor L may be adjusted according to a duty ratio of the clock signal CLK. If the transistor T1 is turned off, the current $I_L$ flowing through the inductor L is applied to the first capacitor C1, and the first capacitor C1 is charged with a voltage according to current-voltage characteristics of the first capacitor C1. Accordingly, the supply voltage Vcc is boosted to then be outputted as a drive voltage AVDD. In addition, the drive voltage generator 710 may output a pulse signal PULSE based upon the supply voltage Vcc and the clock signal CLK.

The drive voltage generator 710 operates in response to the supply voltage Vcc. Accordingly, while the display device is in the power-off period, the supply voltage Vcc, the clock signal CLK and the pulse signal PULSE are reduced to a ground voltage, so that the drive voltage AVDD may be reduced to a level of the ground voltage.

While the drive voltage generator 710 is implemented as a boost converter in the exemplary embodiment, it not limited thereto. For example, in an alternative embodiment, the drive voltage generator 710 may be a DC-DC converter, such as buck converter, a forward converter, or a flyback converter.

The gate-on voltage generator 720 receives the drive voltage AVDD, generates the gate-on voltage Von, and outputs the generated gate-on voltage Von to the first output node N1. In an exemplary embodiment, the gate-on voltage generator 720 is implemented by a charge pumping circuit, as shown in FIG. 5.

Referring to FIG. 5, the gate-on voltage generator 720 includes second and third diodes D2, D3, and second and third capacitors C2, C3. In more detail, the drive voltage AVDD is supplied to the anode of the second diode D2. The cathode of the second diode D2 is connected to the anode of the third diode D3. The gate-on voltage Von is outputted from the cathode of the third diode D3. The second capacitor C2 is connected between the anode of the second diode D2 and the cathode of the third diode D3. The third capacitor C3 applies the pulse signal PULSE to a first connection node N3. However, the configuration of the gate-on voltage generator 720 is not limited to the illustrated example, and it will be understood that the gate-on voltage generator 720 may be implemented in various manners.

The operation of the gate-on voltage generator 720 will now be described. If the pulse signal PULSE is supplied to the third capacitor C3, the first connection node N3 outputs a pulse having an increased voltage level by a voltage level of the pulse signal PULSE higher than that of the drive voltage AVDD. The third diode D3 and the second capacitor C2 clamp the voltage of the first connection node N3 to then output the gate-on voltage Von. The gate-on voltage Von is a DC voltage obtained by shifting the voltage level of the drive voltage AVDD by that of the pulse signal PULSE. Although not shown, the gate-on voltage generator 720 may further include a capacitor which is connected between the cathode of the third diode D3 and the ground voltage. The capacitor may be charged by the gate-on voltage Von and would be capable of preventing a ripple of the gate-on voltage Von.

While the exemplary embodiment shows that the gate-on voltage generator 720 receives the drive voltage AVDD and generates the gate-on voltage Von, in an alternative embodiment, the gate-on voltage generator 720 may receive a voltage different from the drive voltage AVDD to then generate the gate-on voltage Von.

While the display device is in the power-off period, the drive voltage AVDD is reduced to a ground voltage, so that the gate-on voltage Von is reduced to a level of the ground voltage.

The gate-off voltage generator 730 generates a gate-off voltage Voff, and outputs the generated gate-off voltage Voff to the second output node N2. In an exemplary embodiment, the gate-off voltage generator 730 is configured as shown in FIG. 6.

Referring to FIG. 6, the gate-off voltage generator 730 includes fourth and fifth diodes D4, D5, and fourth and fifth capacitors C4, C5. In more detail, the cathode of the fourth diode D4 is connected to the ground voltage. The anode of the fourth diode D4 is connected to the cathode of the fifth diode D5. The gate-off voltage Voff is outputted to the anode of the fifth diode D5. In addition, the fourth capacitor C4 is connected between the cathode of the fourth diode D4 and the anode of the fifth diode D5. The fifth capacitor C5 applies the pulse signal PULSE to a second connection node N4. However, the configuration of the gate-off voltage generator 730 is not limited to the illustrated example, and it will be understood that the gate-off voltage generator 730 may be implemented in various manners.

The operation of the gate-off voltage generator 730 will now be described. If the pulse signal PULSE is supplied to the fifth third capacitor C5, the second connection node N4 outputs a pulse having a decreased voltage level by the voltage level of the pulse signal PULSE lower than that of the ground voltage.

The fourth diode D4 and the fourth capacitor C4 clamp the voltage of the second connection node N4 to then output the gate-off voltage Voff. The gate-off voltage Voff is a DC voltage obtained by shifting the voltage level of the ground voltage by that of the pulse signal PULSE.

The gate-off voltage generator 730 operates such that the pulse signal PULSE goes down to the ground voltage while the display device is in the power-off period, so that the gate-off voltage Voff may be gradually raised to the ground voltage level.

As shown in FIG. 3, a gate-off voltage (Voff) blocking portion 735 is provided between the gate-off voltage generator 730 and the second output node N2. The gate-off voltage blocking portion 735 selectively blocks a current path from the second output node N2 to the gate-off voltage generator 730. In more detail, when the display device is in the power-on period, the gate-off voltage blocking portion 735 opens the current path from the second output node N2 to the gate-off voltage generator 730, so that the gate-off voltage Voff generated from the gate-off voltage generator 730 is transmitted to the second output node N2. On the other hand, when the display device is in the power-off period, the gate-off voltage blocking portion 735 blocks the current path from the second output node N2 to the gate-off voltage generator 730, so that the voltage charged in a pull-up capacitor Cup of the pull-up portion 740 is not discharged to the gate-off voltage generator 730.

The pull-up portion 740 includes a pull-up capacitor Cup, and increases the voltage level of the second output node N2 for the power-off period. In more detail, the pull-up portion 740 is charged while the pull-up capacitor Cup is charged for a first time period of the power-off period and is discharged for a second time period of the power-off period to then increase the voltage level of the second output node N2. Here, the first and second time periods are consecutive periods for the duration of the power-off period. The pull-up portion 740 supplies a voltage Vch charged in the pull-up capacitor for the first time period of the power-off period to the second output node N2, thereby increasing the voltage level of the second output node N2.

For descriptive convenience, while the pull-up portion 740 is configured to increase the voltage level of the second output node N2 using the supply voltage Vcc and the gate-on voltage Von in the exemplary embodiment, in an alternative embodiment the pull-up portion 740 may use the supply voltage Vcc and the drive voltage AVDD, or the gate-on voltage Von and the drive voltage AVDD, for the purpose of increasing the voltage level of the second output node N2.

The pull-up portion 740 will now be described in more detail with reference to FIGS. 7 and 8.

Figure 7:
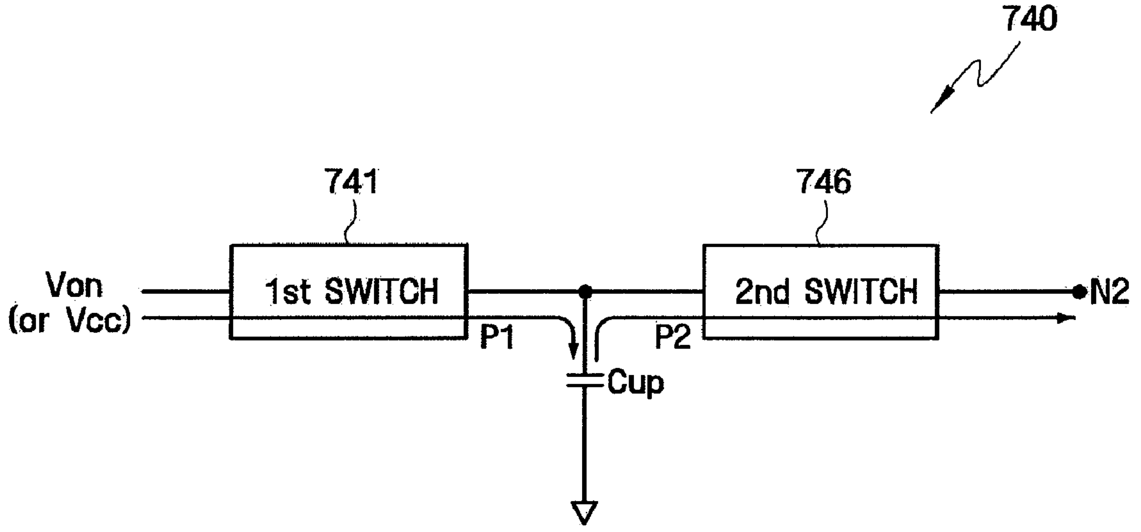
FIG. 7 is a block diagram of the pull-up portion shown in FIG. 3.
Figure 8:
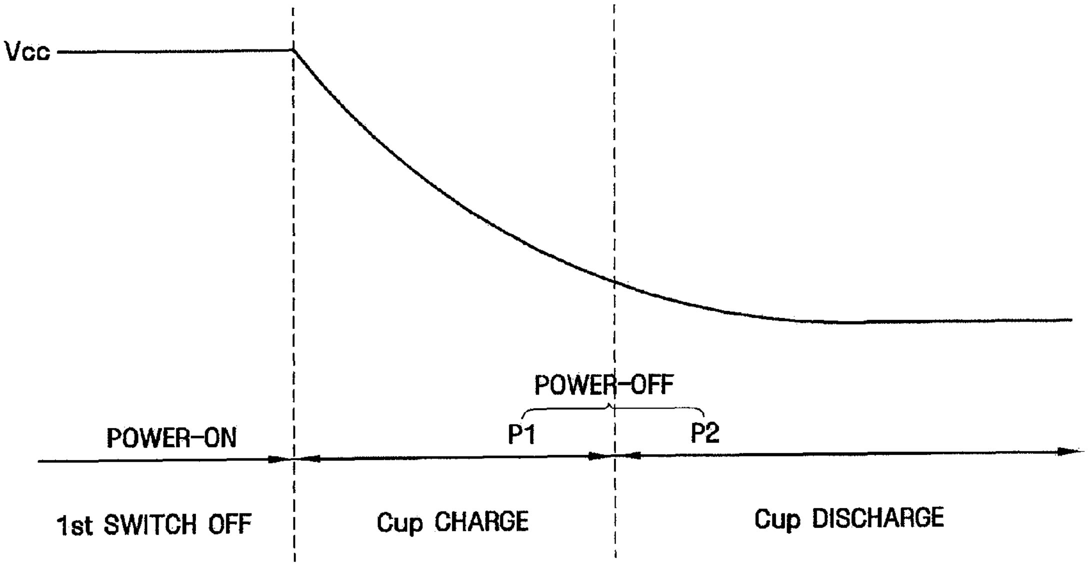
FIG. 8 is a diagram illustrating the operation of the pull-up portion shown in FIG. 7.

FIG. 7 is a block diagram of a pull-up portion shown in FIG. 3, and FIG. 8 is a diagram illustrating the operation of the pull-up portion shown in FIG. 7.

Referring to FIG. 7, the pull-up portion 740 includes a pull-up capacitor Cup, a first switch 741 which is connected to a first voltage and a second voltage and selectively charges the pull-up capacitor Cup using the second voltage according to the first voltage, and a second switch 746 which selectively transmit the voltage charged in the pull-up capacitor Cup to the second output node N2. As shown in FIG. 7, the first and second voltages are a set of a supply voltage Vcc and a gate-on voltage Von, the pull-up capacitor Cup being charged using the gate-on voltage Von according to the supply voltage Vcc.

Although not shown, in an exemplary embodiment of the present invention, the first voltage supplied to the pull-up portion 740 is a drive voltage AVDD. In more detail, the pull-up capacitor Cup may be charged using the gate-on voltage Von according to the drive voltage AVDD. In other exemplary embodiments the second voltage supplied to the pull-up portion 740 may be a drive voltage AVDD. In more detail, the pull-up capacitor Cup is charged using the drive voltage AVDD according to the supply voltage Vcc. The foregoing operations are achieved because the gate-on voltage Von and the drive voltage AVDD are generated based upon the supply voltage Vcc, and decrease to a level of the ground voltage for the power-off period, the supply voltage Vcc, as described above. Accordingly, the gate-on voltage Von and the drive voltage AVDD perform substantially the same functions, in each case of which sets of voltages which can be used as first and second voltages are summarized in Table 1.

TABLE 1

| | First voltage | Second voltage |
|---|---|---|
| Case 1 | Supply voltage Vcc | Gate-on voltage Von |
| Case 2 | Supply voltage Vcc | Drive voltage AVDD |
| Case 3 | Drive voltage AVDD | Gate-on voltage Von |

The operation of the pull-up portion 740 will now be described in more detail with reference to FIGS. 7 and 8. For the sake of illustrative convenience, Case 1 shown in Table 1 will now be described.

First, the first switch 741 is disabled for a power-on period, so that the gate-on voltage Von may not be transmitted to the pull-up capacitor Cup. Since the pull-up capacitor Cup is not charged, the pull-up portion 740 is disabled so that the second output node N2 is maintained at a voltage level of the gate-off voltage Voff supplied from the gate-off voltage generator 730.

However, the first switch 741 is enabled for a first time period P1 of the power-off period, so that the gate-on voltage Von can be transmitted to the pull-up capacitor Cup. Accordingly, the pull-up capacitor Cup is charged with a predetermined voltage Vch using the gate-on voltage Von.

In other words, the pull-up capacitor Cup is charged for the first time period P1 of the power-off period, not for a power-on period of the display device. Accordingly, since the pull-up capacitor Cup is not charged, a large amount of rush current can be prevented from being instantaneously generated when the display device is in the power-on period.

The second switch 746 is enabled for a second time period P2 of the power-off period, so that the voltage Vch charged in the pull-up capacitor Cup can be transmitted to the second output node N2. The voltage level of the second output node N2 increases to that of the voltage Vch charged in the pull-up capacitor Cup to then be pulled down to a level of the ground voltage. Here, the voltage Vch charged in the pull-up capacitor Cup may be a positive voltage. Accordingly, in an exemplary embodiment of the present invention, the voltage generator 700 generates the voltage Vch charged in the pull-up capacitor Cup supplied from the second output node N2, instead of the gate-off voltage Voff, to a plurality of gate lines G1, G2 . . . Gn−1, Gn after the second time period P2 of the power-off period.

For example, if the voltage Vch charged in the pull-up capacitor Cup is supplied to a gate line $G_i$, a switching element (e.g., Q of FIG. 2) is turned on. Accordingly, a data voltage charged in a pixel electrode (PE of FIG. 2) is discharged through the turned-on switching element Q. Since a positive voltage Vdch is supplied to the switching element Q of each pixel PX for the power-off period, the data voltage applied to each of the plurality of the pixel electrodes PE can be rapidly discharged through the turned-on switching element Q. Accordingly, the image sticking occurring for the power-off period is prevented.

Figure 9:
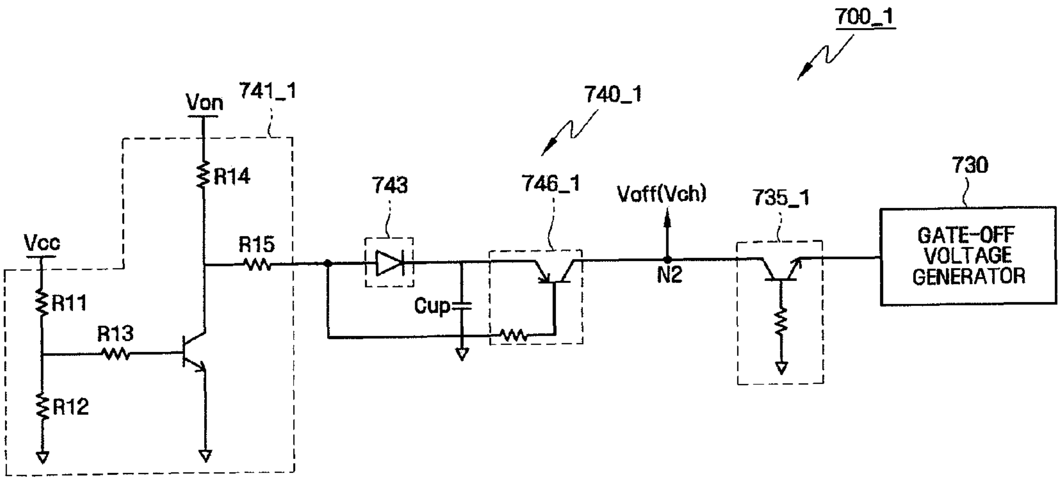
FIG. 9 is a circuit diagram of a voltage generator according to an exemplary embodiment of the present invention.

FIG. 9 is a circuit diagram of a voltage generator (700_1) according to an exemplary embodiment of the present invention. For brevity of illustration, a pull-up portion and a gate-off voltage (Voff) generator are illustrated and a drive voltage generator and a gate-on voltage generator are not illustrated in FIG. 9.

Referring to FIG. 9, the voltage generator 700_1 includes a drive voltage generator, a gate-on voltage generator, a gate-off voltage generator 730, a gate-off voltage (Voff) blocking portion 735_1 and a pull-up portion 740_1. Since the drive voltage generator, the gate-on voltage generator and the gate-off voltage generator are substantially the same as described above in more detail with reference to FIGS. 3 through 6, and thus a detailed description thereof will be omitted.

The gate-off voltage blocking portion 735_1 selectively blocks a current path from a second output node N2 to the gate-off voltage generator 730. In more detail, when the display device is in a power-on period, the gate-off voltage blocking portion 735_1 opens the current path from the second output node N2 to the gate-off voltage generator 730, so that the gate-off voltage Voff generated from the gate-off voltage generator 730 is transmitted to the second output node N2. On the other hand, when the display device is in a power-off period, the gate-off voltage blocking portion 735_1 blocks the current path from the second output node N2 to the gate-off voltage generator 730, so that the voltage charged in a pull-up capacitor Cup of the pull-up portion 740_1 is not discharged to the gate-off voltage generator 730.

While the gate-off voltage blocking portion 735_1 is configured by an NPN bipolar junction transistor which is connected between the second output node N2 and the gate-off voltage generator 730 and in which a ground voltage is applied to its base in the embodiment illustrated in FIG. 9, in an alternative embodiment, the gate-off voltage blocking portion 735_1 may be implemented by a diode which has an anode connected to the second output node N2, a cathode connected to the gate-off voltage generator 730.

The pull-up portion 740_1 includes a first switch 741_1, a pull-up capacitor Cup and a second switch 746_1. The pull-up portion 740_1 is charged with the gate-on voltage Von transmitted to the pull-up capacitor Cup according to a voltage level of the supply voltage Vcc, and transmits a voltage Vch charged in the pull-up capacitor Cup to the second output node N2.

The first switch 741_1 selectively transmits the gate-on voltage Von to the pull-up capacitor Cup according to the supply voltage Vcc. In more detail, for a power-on period, i.e., when the supply voltage Vcc is at an enable level, the first switch 741_1 is disabled so that the gate-on voltage Von may not be transmitted to the pull-up capacitor Cup. On the other hand, for a power-off period, i.e., when the supply voltage Vcc is lower than a predetermined level, the first switch 741_1 is enabled so that the gate-on voltage Von can be transmitted to the pull-up capacitor Cup.

As shown in FIG. 9, the first switch 741_1 includes an NPN bipolar junction transistor which is coupled between the gate-on voltage Von and a ground voltage, and in which the supply voltage Vcc is applied to its base, and a plurality of resistors R11, R12, R13, R14, R15. The plurality of resistors R11, R12, R13, R14, R15 may be optionally omitted according to the sensitivity requested by the first switch 741_1.

The pull-up capacitor Cup receives the gate-on voltage Von and is charged with a predetermined level of a voltage Vch when the first switch 741_1 is enabled. Here, a blocking portion 743, e.g., a diode, is provided between the pull-up capacitor Cup and the gate-on voltage Von, to block a current path from the pull-up capacitor Cup to the gate-on voltage Von. In more detail, the blocking portion 743 opens the current path from the pull-up capacitor Cup to the gate-on voltage Von when the voltage level of the gate-on voltage Von is higher than that of the voltage Vch charged in the pull-up capacitor Cup, thereby supplying the gate-on voltage Von to the pull-up capacitor Cup. On the other hand, when the voltage level of the gate-on voltage Von is lower than that of the voltage Vch charged in the pull-up capacitor Cup (specifically, for a second time period of the power-off period), the blocking portion 743 blocks the current path from the pull-up capacitor Cup to the gate-on voltage Von, thereby preventing the voltage Vch charged in the pull-up capacitor Cup from being discharged to the gate-on voltage Von.

The second switch 746_1 transmits the voltage Vch charged in the pull-up capacitor Cup to the second output node N2 according to the voltage level of the gate-on voltage Von. In more detail, for the first time period of the power-off period, i.e., when the gate-on voltage Von is higher than the voltage Vch charged in the pull-up capacitor Cup, the second switch 746_1 is disabled so that the voltage Vch charged in the pull-up capacitor Cup is not transmitted to the second output node N2. On the other hand, for the second time period of the power-off period, i.e., when the voltage Vch charged in the pull-up capacitor Cup is higher than the gate-on voltage Von, the second switch 746_1 is enabled and transmits the voltage Vch charged in the pull-up capacitor Cup to the second output node N2. As shown in FIG. 9, the second switch 746_1 includes a PNP bipolar junction transistor which is coupled between the pull-up capacitor Cup and the second output node N2 and in which the gate-on voltage Von is applied to its base.

In the voltage generator 700_1 according to the illustrated embodiment, for the power-on period, the gate-on voltage Von is not transmitted to the pull-up capacitor Cup. For the power-off period, i.e., when the supply voltage Vcc is lower than a predetermined voltage level, the gate-on voltage Von is transmitted to the pull-up capacitor Cup and charged in the pull-up capacitor Cup. When the gate-on voltage Von is lower than a predetermined voltage level, the voltage Vch charged in the pull-up capacitor Cup is transmitted to the second output node N2. Therefore, the display device according to the exemplary embodiment of the present invention can prevent a large amount of rush current from being instantaneously generated for the power-on period while suppressing image sticking for the power-off period.

While Case 1 of Table 1 has been described in the embodiment shown in FIG. 9, in an alternative embodiment it will be understood by one skilled in the art that the sets of voltages used as the first and second voltages applied to the first switch 741_1 can be composed of combinations in Cases 2 through 3 of Table 1. The foregoing operations are achieved because the gate-on voltage Von and the drive voltage AVDD are generated based upon the supply voltage Vcc and decrease to a level of the ground voltage for the power-off period, as described above, so that the supply voltage Vcc, the gate-on voltage Von and the drive voltage AVDD perform substantially the same functions.

Figure 10:
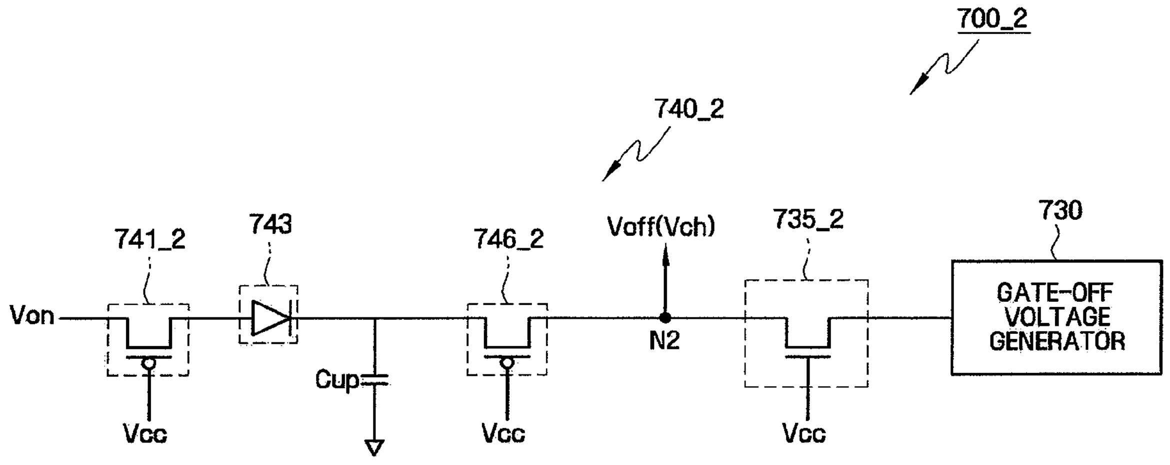
FIG. 10 is a circuit diagram of a voltage generator according to an exemplary embodiment of the present invention.

FIG. 10 is a circuit diagram of a voltage generator (700_2) according to an exemplary embodiment of the present invention. For brevity of illustration, a pull-up portion and a gate-off voltage (Voff) generator are illustrated and a drive voltage generator and a gate-on voltage generator are not illustrated in FIG. 10.

Referring to FIG. 10, the voltage generator 700_2 includes a drive voltage generator, a gate-on voltage generator, a gate-off voltage generator 730, a gate-off voltage blocking portion 735_2 and a pull-up portion 740_2. Here, since the drive voltage generator, the gate-on voltage generator and the gate-off voltage generator are substantially the same as described above in more detail with reference to FIGS. 3 through 6, and thus a detailed description thereof will be omitted.

The gate-off voltage blocking portion 735_2 selectively blocks a current path from the second output node N2 to the gate-off voltage generator 730. As described above with reference to FIG. 9, for a power-on period, the gate-off voltage blocking portion 735_2 opens the current path from the second output node N2 to the gate-off voltage generator 730, so that the gate-off voltage Voff generated from the gate-off voltage generator 730 is supplied to the second output node N2. For a power-off period, the gate-off voltage blocking portion 735_2 blocks the current path from the second output node N2 to the gate-off voltage generator 730, so that the voltage charged in a pull-up capacitor Cup may not be discharged to the gate-off voltage generator 730.

As shown in FIG. 10, the gate-off voltage blocking portion 735_2 is an NMOS transistor which is coupled between the second output node N2 and the gate-off voltage generator 730, and in which a supply voltage Vcc is applied to its gate. However, the configuration of the gate-off voltage blocking portion 735_2 is not limited to the illustrated example. In an alternative embodiment, the gate-off voltage blocking portion 735 may be implemented by an NMOS transistor in which a gate-on voltage Von is applied to its gate, by an NMOS transistor in which a drive voltage AVDD is applied to its gate, or by a diode which has an anode connected to the second output node N2 and a cathode connected to the gate-off voltage generator 730.

The pull-up portion 740_2 includes a first switch 741_2, a pull-up capacitor Cup and a second switch 746_2. When a voltage level of the supply voltage Vcc is lower than that of the first voltage, the gate-on voltage Von is transmitted to the pull-up capacitor Cup to then be charged in the pull-up capacitor Cup. On the other hand, when the supply voltage Vcc is lower than that of the second voltage, the voltage Vch charged in the pull-up capacitor Cup is transmitted to the second output node N2. Here, the voltage level of the second voltage is lower than that of the first voltage.

When the voltage level of the supply voltage Vcc is lower than that of the first voltage, the first switch 741_2 is selectively enabled and transmits the gate-on voltage Von to the pull-up capacitor Cup. In more detail, for the power-on period, i.e., when the supply voltage Vcc is at an enable level, the first switch 741_2 is disabled. On the other hand, for the power-off period, i.e., when the supply voltage Vcc is lower than a predetermined level of the first voltage, the first switch 741_2 is enabled. Accordingly, the gate-on voltage Von is transmitted to the pull-up capacitor Cup. The first switch 741_2 is implemented by a PMOS transistor which is coupled between the gate-on voltage Von and the pull-up capacitor Cup, and in which the supply voltage Vcc is applied to its gate, which is the same as described above in FIG. 9.

As described above with reference to FIG. 9, when the first switch 741_2 is enabled, the pull-up capacitor Cup receives the gate-on voltage Von and is charged with a predetermined voltage Vch. In addition, a blocking portion 743, e.g., a diode, is provided between the pull-up capacitor Cup and the gate-on voltage Von, to block a current path from the pull-up capacitor Cup to the gate-on voltage Von.

When the voltage level of the supply voltage Vcc is lower than that of the second voltage, the second switch 746_2 is selectively enabled and transmits the voltage Vch charged in the pull-up capacitor Cup to the second output node N2. In more detail, for a first time period of the power-off period, i.e., when the voltage level of the supply voltage Vcc is higher than that of the second voltage, the second switch 746_2 is disabled. On the other hand, when the voltage level of the supply voltage Vcc is lower than that of the second voltage, the second switch 746_2 is enabled and transmits the voltage Vch charged in the pull-up capacitor Cup to the second output node N2. As shown in FIG. 10, the second switch 746_2 is implemented by a PMOS transistor which is coupled between the pull-up capacitor Cup and the second output node N2, and in which the supply voltage Vcc is applied to its gate, as shown in FIG. 10.

In the voltage generator 700_2 according to the exemplary embodiment, for the power-on period, the gate-on voltage Von is not transmitted to the pull-up capacitor Cup. On the other hand, for the power-off period, i.e., when the supply voltage Vcc is lower than a voltage level of the first voltage, the gate-on voltage Von is transmitted to the pull-up capacitor Cup and charged in the pull-up capacitor Cup. When the supply voltage Vcc is lower than a voltage level of the second voltage, the voltage Vch charged in the pull-up capacitor Cup is transmitted to the second output node N2. Therefore, the display device according to the exemplary embodiment of the present invention can prevent a large amount of rush current from being instantaneously generated for the power-on period while suppressing image sticking for the power-off period.

While Case 1 of Table 1 has been described in the exemplary embodiment shown in FIG. 10, in an alternative embodiment it will be understood by one skilled in the art that the sets of voltages used as the first and second voltages applied to the first switch 741_2 can be composed of combinations in Cases 2 through 3 of Table 1. The foregoing operations are achieved because the gate-on voltage Von and the drive voltage AVDD are generated based upon the supply voltage Vcc and decrease to a level of the ground voltage for the power-off period, as described above, so that the supply voltage Vcc, the gate-on voltage Von and the drive voltage AVDD perform substantially the same functions.

While exemplary embodiments of the present invention have been particularly shown and described, it will be understood by those of ordinary skill in the art that various changes in form and details may be made therein without departing from the spirit and scope of the present invention as defined by the following claims.

What is claimed is:

1. A display device comprising:

a display panel that displays an image and comprises a gate line and a data line;

a voltage generator that receives a supply voltage and outputs a gate-on voltage to a first output node and a gate-off voltage to a second output node, the voltage generator comprising a pull-up capacitor that is charged when the supply voltage is lower than a first voltage in a power-off period and is discharged when the supply voltage is lower than a second voltage in the power-off period to increase a voltage level of the second output node; and a data driver that applies a data voltage to the data line, wherein a voltage level of the second voltage is lower than a voltage level of the first voltage.

2. The display device of claim 1, wherein the voltage generator further comprises:

a first switch that is enabled for the first time period and that transmits the gate-on voltage to the pull-up capacitor to charge the pull-up capacitor; and a second switch that is enabled for the second time period and that transmits the voltage charged in the pull-up capacitor to the second output node.

3. The display device of claim 2, wherein the first switch transmits the gate-on voltage to the pull-up capacitor according to the supply voltage, and the second switch transmits the voltage charged in the pull-up capacitor to the second output node according to the gate-on voltage.

4. The display device of claim 3, wherein the first switch comprises an NPN bipolar junction transistor, and the second switch comprises a PNP bipolar junction transistor.

5. The display device of claim 2, wherein when the supply voltage is lower than a first voltage, the first switch is enabled to transmit the gate-on voltage to the pull-up capacitor, and when the supply voltage is lower than a second voltage, the second switch transmits the voltage charged in the pull-up capacitor to the second output node.

6. The display device of claim 1, wherein the voltage generator further outputs a drive voltage based upon the supply voltage, the gate-on voltage is generated based upon the drive voltage, and the voltage generator further comprises:

a first switch that is enabled for the first time period and that transmits the gate-on voltage to the pull-up capacitor to charge the pull-up capacitor; and a second switch that is enabled for the second time period and that transmits the voltage charged in the pull-up capacitor to the second output node.

7. The display device of claim 6, wherein the first switch transmits the gate-on voltage to the pull-up capacitor according to the drive voltage, and the second switch transmits the voltage charged in the pull-up capacitor to the second output node according to the gate-on voltage.

8. The display device of claim 6, wherein:

when the drive voltage is lower than a first voltage, the first switch is enabled to transmit the gate-on voltage to the pull-up capacitor, and when the drive voltage is lower than a second voltage, the second switch transmits the voltage charged in the pull-up capacitor to the second output node, a voltage level of the second voltage being lower than that of the first voltage.

9. The display device of claim 1, wherein the voltage generator further comprises:

a gate-off voltage generator that generates the gate-off voltage; and a gate-off voltage blocking portion that blocks a current path from the second output node to the gate-off voltage generator during the power-off period.

10. The display device of claim 1, wherein the display panel further comprises a switching element that selectively connects the data line to a pixel electrode line according to the gate-on voltage or the gate-off voltage, the switching element being turned on for the second time period.

11. The display device of claim 1, further comprising:

a display panel that displays an image and comprises a gate line and a data line;

a gate driver that selectively applies the gate-on voltage or the gate-off voltage to the gate lines; and a data driver that applies a data voltage to the data line, wherein the pull-up capacitor is charged for a first time period of the power-off period and is discharged for a second time period of the power-off period.

12. A display device comprising:

a display panel that displays an image and comprises a gate line and a data line; and a voltage generator that comprises:

a pull-up capacitor;

a first switch that is connected to a first voltage and a second voltage and that selectively charges the pull-up capacitor using the second voltage according to the first voltage; and a second switch that selectively transmits the voltage charged in the pull-up capacitor to the gate-off voltage output node, wherein the first switch is enabled for a first time period of a power-off period, and the second switch is enabled for a second time period of the power-off period, the first time period and the second time period being consecutive periods of the power-off period, wherein the voltage generator further comprises a gate-on voltage generator that generates a gate-on voltage based upon a supply voltage, the first voltage being the supply voltage and the second voltage being the gate-on voltage, and wherein when the supply voltage is lower than a first voltage, the first switch is enabled to transmit the gate-on voltage to the pull-up capacitor, and when the supply voltage is lower than a second voltage, the second switch is enabled to transmit the voltage charged in the pull-up capacitor to the gate-off voltage output node, a voltage level of the second voltage being lower than a voltage level of the first voltage.

13. A display device comprising:

a display panel that displays an image and comprises a gate line and a data line; and a voltage generator that comprises:

a pull-up capacitor;

a first switch that is connected to a first voltage and a second voltage and that selectively charges the pull-up capacitor using the second voltage according to the first voltage; and a second switch that selectively transmits the voltage charged in the pull-up capacitor to the gate-off voltage output node, wherein the first switch is enabled for a first time period of a power-off period, and the second switch is enabled for a second time period of the power-off period, the first time period and the second time period being consecutive periods of the power-off period, wherein the voltage generator further comprises a drive voltage generator that generates a drive voltage based upon the supply voltage, and a gate-on voltage generator that generates the gate-on voltage based upon the drive voltage, the first voltage being the drive voltage and the second voltage being the gate-on voltage, and wherein when the drive voltage is lower than the first voltage, the first switch is enabled to transmit the gate-on voltage to the pull-up capacitor, and when the drive voltage is lower than the second voltage, the second switch is enabled to transmit the voltage charged in the pull-up capacitor to the gate-off voltage output node, a voltage level of the second voltage being lower than that of the first voltage.

* * * * *